G. M. TODD.
Plow-Attachment.

No. 169,313.

Patented Oct. 26, 1875.

Witnesses.
G. G. Gage.
John A. Myers.

Inventor.
Geo. M. Todd.

UNITED STATES PATENT OFFICE.

GEORGE M. TODD, OF WATERLOO, IOWA.

IMPROVEMENT IN PLOW ATTACHMENTS.

Specification forming part of Letters Patent No. 169,313, dated October 26, 1875; application filed October 1, 1874.

*To all whom it may concern:*

Be it known that I, GEORGE M. TODD, of Waterloo, in Black Hawk county, State of Iowa, have invented certain Improvements in Draft and Plow-Beam Attachments for Sulky-Plows, of which the following is a specification:

The object of my invention is to lighten the draft and perform more work with less power than by the ordinary construction in sulky-plows.

Figure 1:
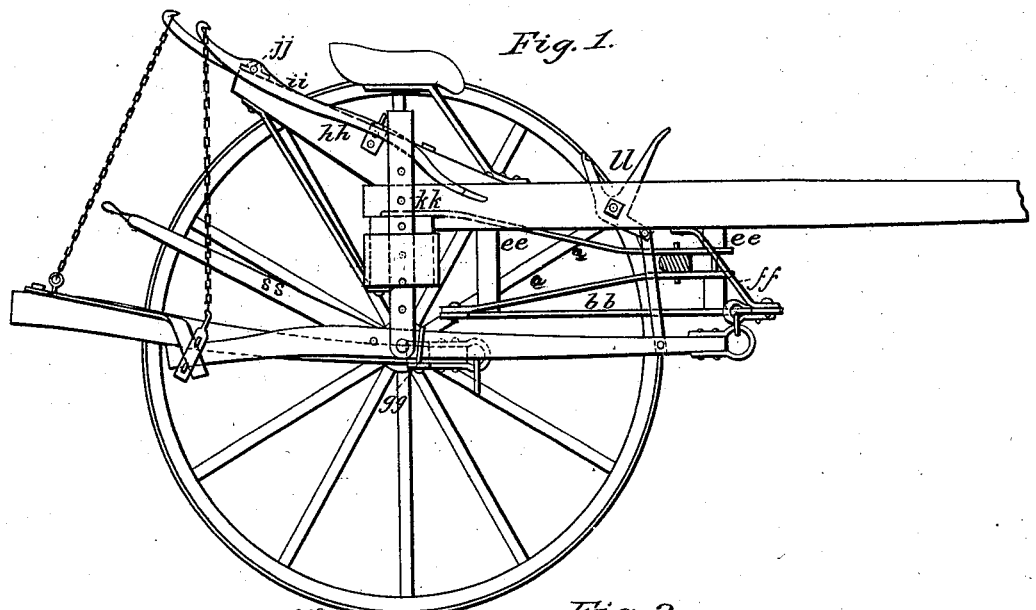
Figure 2:
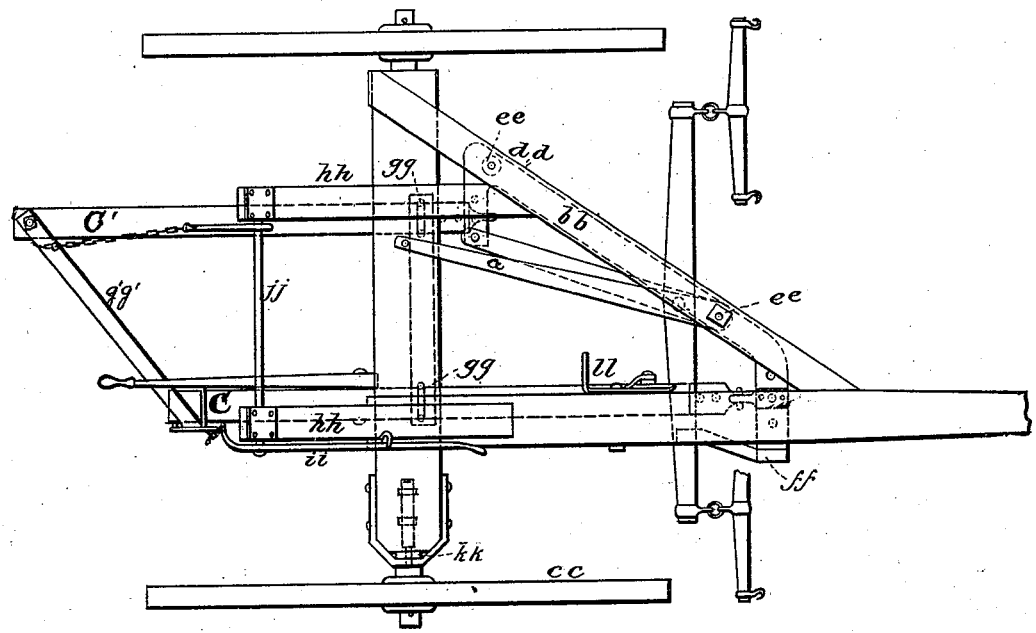

The construction and operation of said draft and plow-beam attachments are described as follows, to wit:

Figure 1 represent a side view of said attachment, as suspended from the beam and diagonal brace. Fig. 2 represents a plan view of the machine, showing the draft attachments.

$b\ b$, in Fig. 1, represent the draft-bar, to which the plows are attached, which bar runs under and below the diagonal brace $d\ d$, in Fig. 2, and is attached to said brace by bolts at the points $e\ e$. Sleeves upon the long bolts serve to hold it rigidly in proper position, and braces front and rear strengthen it against the draft-strain. $g\ g$ and $g'\ g'$, in Fig. 2, represent the coupling under the axle which attaches the plows together. $h\ h$ represent the two arms fastened to the axle and sulky-frame, and projecting backward and upward therefrom, support the roller $j\ j$ and the lever $i\ i$, to the arms of which the chains for lifting the rear end of the plow-beams are attached. $k\ k$, in Fig. 2, represent the stub-axle of the furrow-wheel, which adjusts in a slide upon the end of the axle, and is held at any height by a bolt or pin inserted in one of a series of holes. $l\ l$, in Fig. 1, represents the hand or foot lever, to raise or lower the forward end of the plow-beam.

The action and operation of the said invention are illustrated in detail as follows: The plow-beam at its front end is set about one foot ahead of the evener, thus bringing the team nearer to the plow, and shortening or lightening the draft, and lessening the power usually required in single or double plows. The evener is placed about midway between the sulky-frame and the draft-bar, between two braces, through whose front ends the bolt $e\ e$ passes, and whose rear ends are bolted, one to the axle and the other to the rear end of the draft-bar, thus enabling the plows to move or pass more readily by or around obstructions.

The power being applied thus above, and not to the plows directly, permits the plows to move more freely and lightly. The plow nearest to the furrow-wheel is attached to front end of the draw-bar $b\ b$ by a clevis, and the second plow is attached to the rear end of the draw-bar in the same way.

The two plows are attached together by the coupling $g\ g$ and $g'\ g'$, passing from center of the beam of the forward plow to the beam of the back plow, at or near the plow-clevis, and the back coupling $g'\ g'$ passing from the beam of forward plow at or close to land-side handle to the beam of back plow at or near the shank of mold-board, and being rigidly secured, giving like and uniform action to the two plows.

The foot or hand lever $l\ l$ is connected to the front end of the beam of the forward plow by an iron strap, which raises or lowers the plows, and by this means the plows are set or put into the ground readily to the required depth.

$s\ s$ is the standard or plow-holder, attached to forward plow-beam, near the center, and passing up to the side of the driver. By this handle he can turn or tilt the plows from side to side, and thus turn the plows out or put them deeper into the ground at his pleasure, thus giving a freer action to the plows than where self-holders are used, and more readily shaking out and removing clods.

The lever $i\ i$ is attached to the plows by chains at the hind coupling $g\ g$, and by bringing this lever forward and down I raise the plows clear from the ground, and easily and readily above any obstructions, readily turning around at corners or passing over or across, plowing at pleasure without the plows constantly dipping or catching into the ground or obstructions.

I claim as my invention—

1. In a sulky-plow, the angular draw-bar *b b*, suspended below the frame by the long bolts and sleeves *e e*, and braces *f f* and *a a*, as set forth.

2. The combination of the draw-bar *b b* and braces *a a* with the sulky-frame, and with the plow-beams *c c*, and the adjustable connecting-bars *g g*, substantially as shown and described.

GEORGE M. TODD.

In presence of—
  J. A. BURNHAM,
  D. A. DODGE.